United States Patent
Klein

(10) Patent No.: US 6,397,510 B1
(45) Date of Patent: Jun. 4, 2002

(54) FISHING BOBBER WITH STRIKE-INDICATING RADIO TRANSMITTER

(76) Inventor: Darrel J. Klein, R.R. 2, Box 17, Breckenridge, MN (US) 56520

(*) Notice: Subject to any disclaimer, the term of this patent is extended or adjusted under 35 U.S.C. 154(b) by 0 days.

(21) Appl. No.: 09/571,368

(22) Filed: May 15, 2000

(51) Int. Cl.⁷ ................................................ A01K 93/02
(52) U.S. Cl. .......................................... 43/17; 43/44.87
(58) Field of Search ....................... 43/17, 44.87, 44.9, 43/44.91, 44.94

(56) References Cited

U.S. PATENT DOCUMENTS

| | | | |
|---|---|---|---|
| 2,790,263 A | * 4/1957 | Chaney | 43/17 |
| 3,559,224 A | * 2/1971 | Shimizu | 43/17.5 |
| 4,109,404 A | * 8/1978 | Preeschl | 43/17 |
| 4,109,405 A | * 8/1978 | Ito | 43/17.5 |
| 4,234,913 A | 11/1980 | Ramme | |
| 4,437,255 A | * 3/1984 | Reed | 43/17 |
| 4,625,446 A | * 12/1986 | Morimoto | 43/17 |
| 4,713,967 A | * 12/1987 | Overs et al. | 43/4 |
| 4,748,760 A | 6/1988 | Widmer | |
| 4,884,355 A | 12/1989 | Niehoff et al. | |
| 4,891,902 A | 1/1990 | Whitney | |
| 4,916,846 A | 4/1990 | Pehm | |
| 4,996,788 A | * 3/1991 | Wieting et al. | 43/17 |
| 5,086,581 A | 2/1992 | Barra et al. | |
| 5,097,618 A | * 3/1992 | Stoffel | 43/17 |
| 5,199,205 A | 4/1993 | Klammer | |
| 5,351,431 A | * 10/1994 | Ryu | 43/17 |
| 5,351,432 A | * 10/1994 | Tse | 43/17 |
| 5,483,767 A | * 1/1996 | Langer | 43/4 |
| 5,675,927 A | 10/1997 | Kloos | |

FOREIGN PATENT DOCUMENTS

| | | | |
|---|---|---|---|
| GB | 2244196 B1 | * 11/1991 | |
| JP | 3-72831 B1 | * 3/1991 | |
| JP | 11-23708 B1 | * 1/1999 | |

* cited by examiner

*Primary Examiner*—Darren W. Ark
(74) *Attorney, Agent, or Firm*—James V. Harmon

(57) ABSTRACT

The invention provides a fishing bobber having a strike-indicating radio transmitter for transmitting a radio signal to the fisherman when there is a strike on the line. The bobber includes a bobber body adapted to float on a body of water with a fishing line connected to it during use. The radio transmitter is supported by and preferably housed within the bobber. Operatively connected to the transmitter is a transmitter switch for actuating the transmitter. An operating means is connected to the switch for closing the switch in response to a fish exerting tension on the fishing line to thereby operate the radio transmitter so as to broadcast a radio signal to alert the fisherman when a fish strikes. In one preferred form the bobber includes an auxiliary float that can move up and down relative to the bobber for actuating the switch. In another form, the bobber itself is connected to slide up and down on a post which is connected to the fishing line, so that when the post is pulled downwardly by tension on the line the bobber slides upwardly toward the top of the post, thereby closing the transmitter switch. The radio transmitter can also be supported on a transmitter float which floats on the surface of the water next to the bobber and is connected to it electrically.

3 Claims, 2 Drawing Sheets

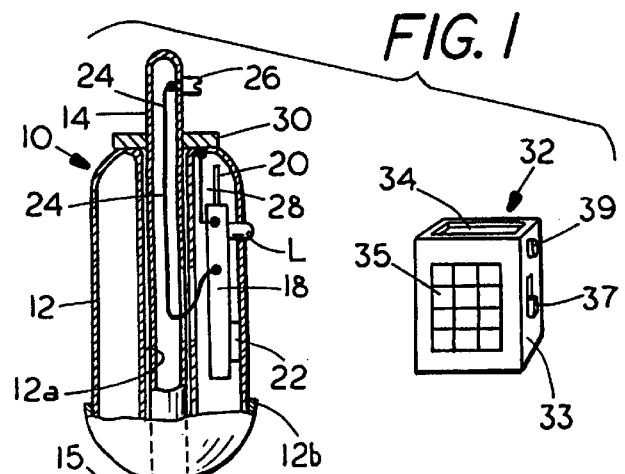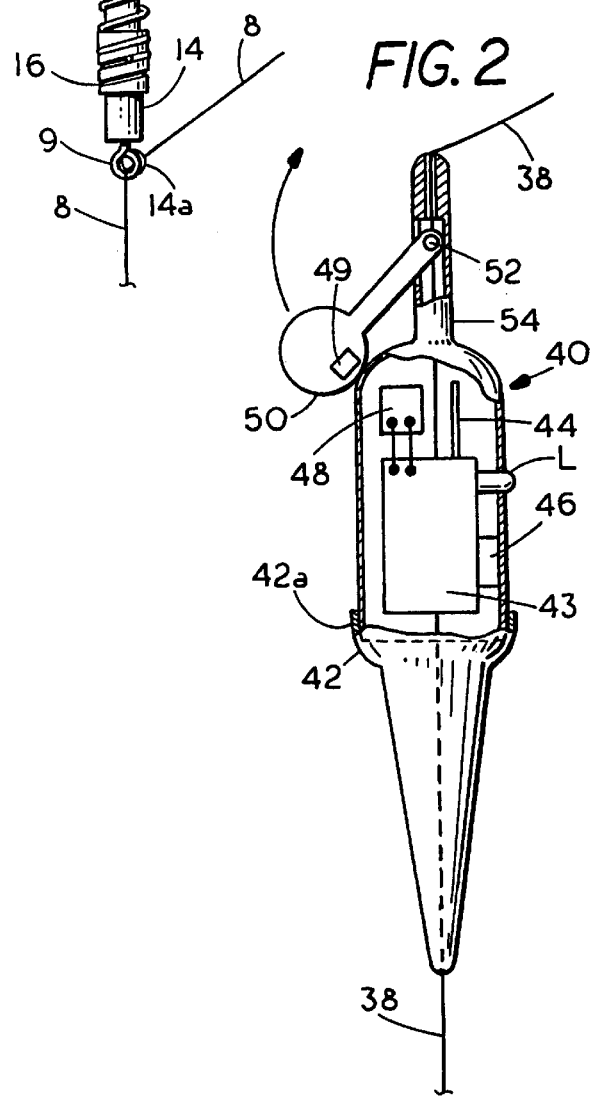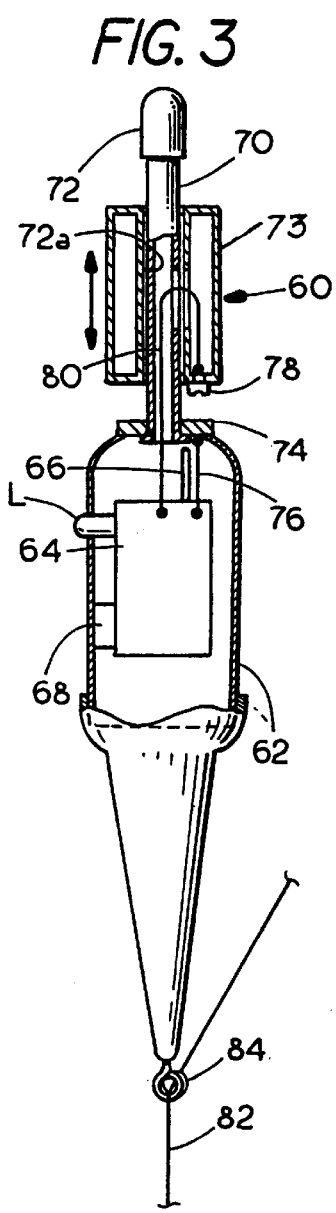

FISHING BOBBER WITH STRIKE-INDICATING RADIO TRANSMITTER

FIELD OF THE INVENTION

This invention relates to fishing and more particularly to a fishing bobber having a radio transmitter for indicating a strike.

BACKGROUND OF THE INVENTION

A variety of strike indicators have been used with various articles of fishing equipment. One is a light indicator operated by a battery. When a fish strikes, the light is turned on. Another common indicator is a flag which is elevated when there is a strike on the line. These prior systems are not always reliable, particularly when the fisherman is busy with other activities, is resting or in the fish house where the fishing equipment cannot be seen. Accordingly, there exists a need for a more highly effective indicator to let the fisherman know when there is a strike on the line even if he is occupied with other duties or is in an area where the fishing equipment cannot be seen.

In view of these shortcomings, it is a primary object of the present invention to provide an improved fishing bobber which is inexpensive, light in weight, rugged in construction, and will reliably signal the fisherman when there is a strike on the line without the need for a visible indicator.

Another object is to provide a way of actuating an indicator by means of a movable float connected to the fishing bobber.

Yet another object is to provide an improved indicator for signaling a fish on the line which has a provision for attaching the line to the bobber without having to cut the line.

These and other more detailed and specific objects of the present invention will be better understood by reference to the following figures and detailed description which illustrate by way of example of but a few of the various forms of the invention within the scope of the appended claims.

SUMMARY OF THE INVENTION

The invention provides a fishing bobber having a strike-indicating radio transmitter for transmitting a radio signal to the fisherman when there is a strike on the line. The bobber includes a bobber body adapted to float on a body of water with a fishing line connected to it during use. The radio transmitter is supported by and preferably housed within the bobber. Operatively connected to the transmitter is a transmitter switch for actuating the transmitter. An operating means is connected to the switch for closing the switch in response to a fish exerting tension on the fishing line to thereby operate the radio transmitter so as to broadcast a radio signal to alert the fisherman when a fish strikes. One preferred form the bobber includes an auxiliary float that can move up and down relative to the body of the bobber for actuating the switch. In another form, the bobber body slides up and down on a post which is connected to the fishing line, so that when the post is pulled downwardly by tension on the line the bobber body slides upwardly toward the top of the post, thereby closing the transmitter switch. The radio transmitter can also be supported on a transmitter float which floats on the surface of the water next to the bobber and is connected to it electrically.

THE FIGURES

FIG. 1 is a side elevational view partly in section of a bobber in accordance with the invention and a remote radio receiver.

FIG. 2 is a vertical sectional view of another form of bobber in accordance with the invention.

FIG. 3 is a side elevational view partly in section of another form of bobber in connection with the invention.

DETAILED DESCRIPTION OF THE INVENTION

Figure 4:
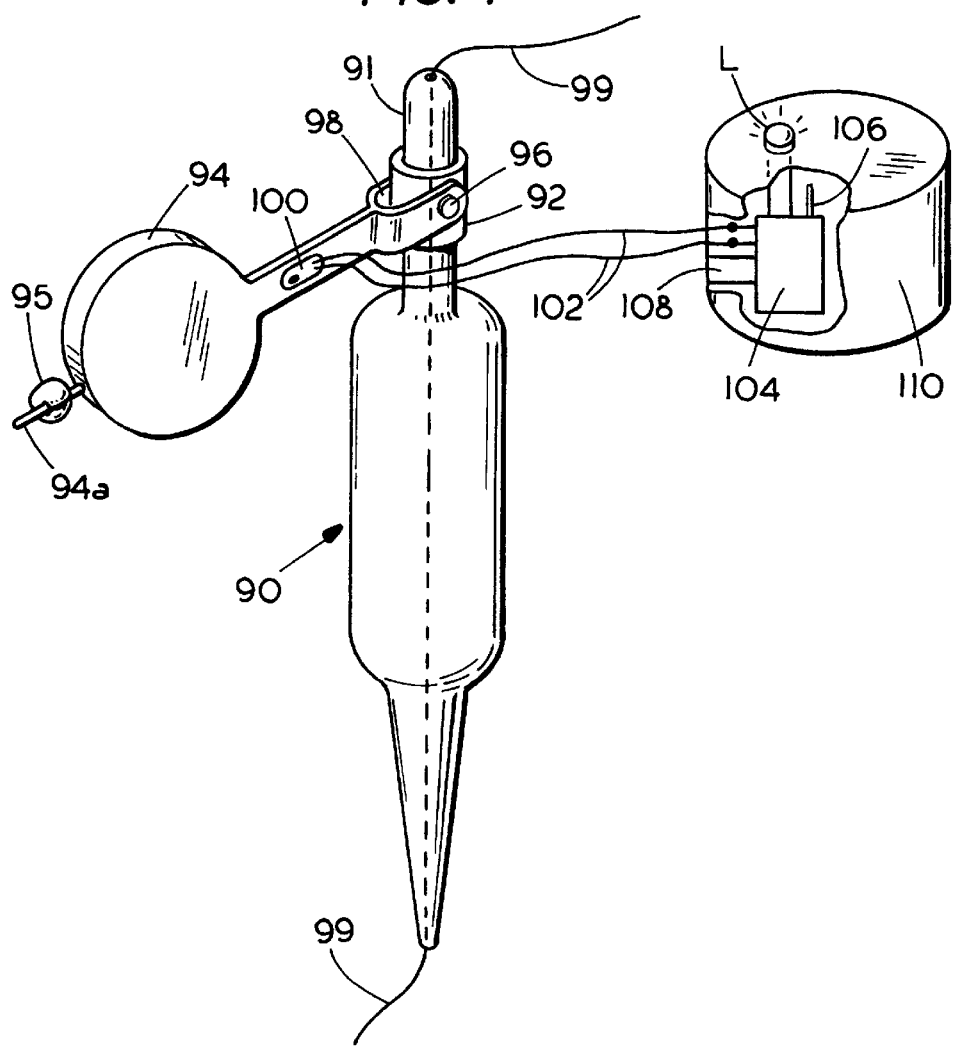
FIG. 4 is a perspective view of a modified form of bobber.

Refer now to the drawings in which the same numerals refer to corresponding parts in the several view.

FIG. 1 illustrates a bobber 10 in accordance with the invention and a radio receiver 32 which is in the possession of the fisherman who may be at some distance, e.g., 20' to 200', from the bobber. The bobber 10 includes a bobber body 12 which can formed from metal or plastic that in this case is hollow and includes an inner vertical passage 12a within which is slidably mounted a post 14 having a snap ring 14a at its lower end to which a fishing line 8 is connected during use. The lower portion of the post 14 is provided with external screw threads at 16 onto which a tension spring 15 is threaded. The bobber body 12 can be provided with a bottom portion that fits telescopically over an upper portion at 12b so that the bobber body 12 can be opened when required. Inside the bobber body 12 is a radio transmitter 18 having an aerial 20 and replaceable battery 22. The transmitter 18 is connected to a switch terminal 26 by means of a conductor 24 and via conductor 28 to a second switch terminal 30 connected to the top of the bobber body 12. The transmitter 18 also has an LED light L to provide a visual signal when the transmitter is actuated and to check the working condition of the radio transmitter. During operation, when a fish exerts tension on the line 8, the post 14 is forced downwardly against the tension of the spring 15, causing the switch terminals 26 and 30 to contact one another so as to complete a circuit to turn on the transmitter 18, thereby broadcasting a radio signal from aerial 20 to the receiver 32 in the possession of the fisherman. While any suitable transmitter can be used, a preferred transmitter comprises a programmable transmitter of the same general type as used, for example, in a commercial garage door opener in which a coded signal is transmitted when the circuit is completed through switch 26, 30. The coded signal can, for example, comprise a digital numerically coded signal such as 0001101111001000. When the correct coded signal is received by the receiver 32, the receiver emits a coded audible alarm such as a single beep or any predetermined number of beeps to alert the fisherman that a fish is on the line and that the signal came from bobber #1. The received can also display a light signal and/or a vibrating signal. Other bobbers that are used by the fisherman are coded differently to produce a different series of beeps so that the fisherman knows which bobber has a strike. In order to control the sensitivity of the bobber 10, the bobber body 12 can be rotated on the post 14 so as to thread the tension spring 15 either up or down in the screw threads 16 and thereby shorten the spring, thus requiring a greater tug on the line to close the switch 26, 30. If desired, a nut (not shown) can be screw-threaded onto the lower end of the post 14 for changing the tension of the spring 15.

The radio receiver 32 can comprise any suitable radio receiver circuit but preferably comprises a receiver 32 similar to a commercially available display pager having a casing 33, a dialing pad 35, and an alphanumeric display 34 that also displays which of several bobbers has a strike. The pager is also provided with an ON/OFF switch 37 and an audible alarm 39. When the bobber 10 is to be used, the transmitter 18 is first programmed so that the desired number of alarm signals are produced by the audible alarm 39 or other alarm. Similar bobbers that are owned by the same fisherman can be programmed to produce a different number of signals.

The transmitter 18 can be removed if desired, allowing the bobber 10 to be sold as a less expensive bobber. Similarly, the light L can also be removed. The light L and transmitter 18 can then be offered to customers as options as extra cost.

Refer now to FIG. 2 which illustrates another bobber in accordance with the invention. In this case, the bobber indicated generally at 40 has a bobber body 42 which is hollow and includes upper and lower portions that are connected together by means of a telescopic sliding fit at 42a. Inside the hollow interior of the bobber 40 is a radio transmitter 43 of the same type described above in connection with FIG. 1 and including an aerial 44, a replaceable battery 46, an LED L to indicate a strike on the line, and an ON/OFF switch 48 for activating the transmitter. The switch 48 in this case comprises a magnetic proximity switch that is activated during operation by means of a magnet 49 contained in an auxiliary float 50 which is supported on a pivot 52 that is connected to the upper end of a vertical extension 54 at the upper end of the bobber body 42. In this case, the fishing line 38 extends through the bobber 40 from the top all the way through the center and out through the bottom portion of the bobber body 42 as shown in FIG. 2. During operation, when a fish exerts tension on the line 38, the bobber 40 will become partially submerged whereupon the auxiliary float 50 will be elevated, causing the magnet 49 to move away from the switch 48, thereby actuating the transmitter 43 so as to transmit a radio signal via aerial 44 and causing the receiver 32 to produce an audible alarm or other alarm. The visual indicator LED L is also turned on. Because the signal from the transmitter 43 is coded, the fisherman will know by the number of beeps produced by the audible alarm 39 or other alarm on the receiver 32 which bobber has a fish on the line.

Refer now to FIG. 3 which indicates a bobber indicated generally at 60 having a hollow bobber body 62 enclosing a radio transmitter 64 that is provided with an aerial 66 and a replaceable battery 68. Projecting from the bobber body 62 is a vertical extension 70 having a cap 72 secured to its upper end. Loosely mounted on the extension 70 is an auxiliary float 73 which is adapted to slide up and down on the extension 70 during use. At the top of the bobber body 62 is fixed switch terminal 74 that is connected to the transmitter 64 by means of a conductor 76. Also connected to the transmitter 64 is a second switch terminal 78 that is mounted on the auxiliary float 73 and is wired to the transmitter by means of conductor 80. The switch terminals 74, 78 together comprise a normally closed transmitter actuator switch which operates the transmitter 64 whenever the terminals 74, 78 are opened. Thus, during operation, when tension is exerted by a fish striking the line 82, the bobber 62 is pulled downwardly, causing the auxiliary float 73 to slide upwardly on extension 70, thereby opening the switch 74, 78 so as to actuate the transmitter 64 and in turn transmitting a radio signal via aerial 66 to the receiver 32 to let the fisherman know that a fish is on the line.

Refer now to FIG. 4 which illustrates another embodiment of the invention. In this case, the bobber is indicated generally at 90 and includes a vertical extension 91 to which is secured a sleeve 92 with an auxiliary float 94 pivoted thereto at 96. Float 94 carries a radio transmitter actuator switch, such as a mercury switch 100 that is wired by means of conductors 102 to a radio transmitter 104 having an aerial 106, a replaceable battery 108 and a visual indicator comprising an LED lamp L. A weight 95 can be moved toward or away from pivot 96 on pin 94a and then clamped in place to control the movement of auxiliary float 94 and hence the sensitivity of mercury switch 100. The transmitter 104 in this case is mounted within a hollow transmitter float 110 which comprises a part of the bobber 90 and is connected to it by means of the electrical conductors 102 so as to float during operation on the surface of the water next to the bobber 90. The transmitter float 110 is especially useful when a heavy or bulky transmitter 104 is used, since the float 110 can be made any suitable size, for example as large as two or three inches in diameter and two inches in height. During operation, when a fish pulls downwardly on the line 99, the bobber 90 will be pulled down in the water, causing the auxiliary float 94 to pivot upwardly about the pivot 96 thereby closing the switch 100 so as to complete a circuit through conductors 102, actuating the transmitter 104 so as to transmit a radio signal from the aerial 106 and simultaneously turn on the visual LED signal light L to alert the fisherman that a fish is on the line. Normally, the primary signal comprises a series of beeps produced by the audible alarm 39 of the receiver 32. The LED light L merely provides an auxiliary signaling means.

Figure 5:
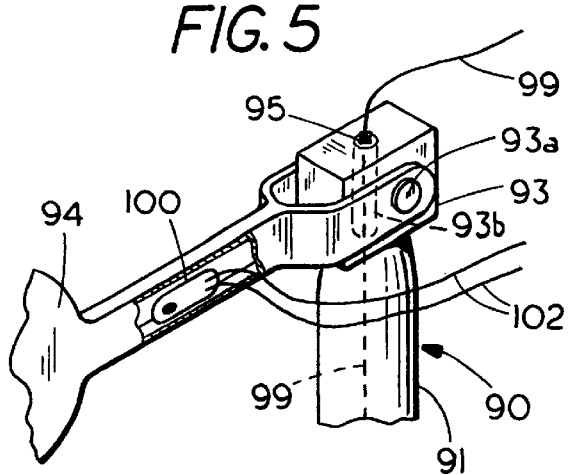
FIG. 5 is a partial perspective view of the top portion of the bobber of FIG. 4 with a float connected in a different way.

Refer now to FIG. 5 which illustrates a modified form of the bobber of FIG. 4 in which the sleeve 92 has been eliminated and replaced by a pivot base 93 having a vertical passage 93b through which the fishing line 99 passes downwardly into the vertical extension 91. A knot 95 is made in the line above the pivot base 93 to hold the pivot base in place just above the upper end of the extension 91, thus serving as a fastener for fastening the auxiliary float to the body portion of the bobber 90. The term "fastener" herein is used broadly to include any of a variety of commercially available fasteners such as a snap fastener in which the line 99 is snapped into the mouth or opening in the snap fastener, or a double wire ring fastener of the type commonly used in fishing bobbers as well as eye fasteners in which a loop of fishing line is placed through the eye and then around the entire bobber to connect the line to the bobber. Other types of fasteners that can be used include split washer type fasteners in which two washer halves are hinged together at a pivot point, allowing the halves to be brought together for enclosing the line within a hole at the center of the split washer. Any of a variety of other fasteners that can be employed for securing the fishing line 99 to the bobber 90 will be apparent to those skilled in the art. As shown in the various figures, the fishing line can be connected either to the bottom of the bobber or can extend entirely through the bobber, if desired.

Many variations of the present invention within the scope of the appended claims will be apparent to those skilled in the art once the principles described herein are understood.

What is claimed is:

1. A fishing bobber with a strike-indicating radio transmitter, comprising:

a bobber body adapted to float on a body of water and being connectable to a fishing line during use, a radio transmitter connected to the bobber, a transmitter switch operatively connected to the transmitter to actuate the transmitter for transmitting a radio signal to a radio receiver when a strike occurs, operating means connected to the switch for actuating the switch responsive to a fish pulling on the line to thereby operate the radio transmitter for broadcasting a radio signal to alert a fisherman when a fish exerts tension on the fishing line connectable to the bobber, the transmitter comprising a digital transmitter for broadcasting a signal with a predetermined digital code, the receiver is a digital radio receiver for responding to digital signals of a predetermined code to thereby provide an alarm signal to the user when a coded signal having said predetermined code is transmitted by the bobber to the receiver, the operating means is a float that is mounted upon the bobber to move up and down thereon, the bobber body has a hollow casing containing the transmitter, the casing being sealed to prevent the entry of water during use and being devoid of an opening through which water can enter and, the bobber is connectable to the fishing line so that the switch is actuated when the float moves upwardly on the bobber responsive to a downward force on the fishing line exerted by a fish.

2. The fishing bobber of claim 1 wherein the receiver has an alarm selected from an audible alarm, an electric light and a vibrator to signal a strike when the switch is actuated.

3. The fishing bobber of claim 1 wherein the transmitter has a signal light wired thereto that is energized when the transmitter is on.

* * * * *